United States Patent
Winshtein (10) Patent No.: US 9,868,520 B1
(45) Date of Patent: Jan. 16, 2018

(54) LANDING GEAR APPARATUSES AND APPLICATIONS THEREOF

(71) Applicant: Ronny Winshtein, Ramat-Hasharon (IL)

(72) Inventor: Ronny Winshtein, Ramat-Hasharon (IL)

(73) Assignee: Softwheel LTD., Tel-Aviv (IL)

( * ) Notice: Subject to any disclaimer, the term of this patent is extended or adjusted under 35 U.S.C. 154(b) by 26 days.

(21) Appl. No.: 14/643,691

(22) Filed: Mar. 10, 2015

Related U.S. Application Data (60) Provisional application No. 61/950,664, filed on Mar. 10, 2014.

(51) Int. Cl.
*B64C 25/60* (2006.01)
*B64C 25/62* (2006.01)
*B64C 25/34* (2006.01)

(52) U.S. Cl.
CPC .............. *B64C 25/62* (2013.01); *B64C 25/34* (2013.01); *B64C 2025/345* (2013.01)

(58) Field of Classification Search
CPC .... B60B 9/28; B60B 9/20; B60B 9/24; B60B 2900/313; B60B 9/02; B60G 2204/30;
(Continued)

(56) References Cited

U.S. PATENT DOCUMENTS

| | | | |
|---|---|---|---|
| 926,830 A | 7/1909 | Sinnott | |
| 1,132,787 A | 3/1912 | Mansfield | |

(Continued)

FOREIGN PATENT DOCUMENTS

| | | |
|---|---|---|
| CN | 2157878 Y | 3/1994 |
| CN | 201214359 Y | 4/2009 |

(Continued)

OTHER PUBLICATIONS

International Search Report for International Application No. PCT/IB2014/000580 dated Sep. 22, 2014.

(Continued)

*Primary Examiner* — Richard G Davis
(74) *Attorney, Agent, or Firm* — Clements Bernard Walker PLLC; Christopher L. Bernard

(57) ABSTRACT

Landing gear apparatuses and applications, wherein wheels include embedded (in-wheel) high impact shock absorbing capabilities. Landing gear assembly includes: wheel with wheel rim connected to wheel hub, wheel rim encompasses inner boundary and has inner radius, wheel hub is movable and positionable to a nominal position in space within rim inner boundary; a wheel hub positioning mechanism, connected to wheel hub, selectively confining and positioning wheel hub within space to pre-determined position different from nominal position; and wheel hub suspension assembly, connected to wheel hub, operable in response to hub moving relative to pre-determined position, and including damper for absorbing shocks or/and dissipate kinetic energy during hub motion. When wheel is subjected to landing impact shock at least 2 meters-per-second vertical velocity, hub moves from or across pre-determined position towards rim inner boundary, along wheel hub maximal shifting path longer than rim inner radius. Applicable to various (airbound) landing vehicles.

20 Claims, 6 Drawing Sheets

STEADY　　　　　　　　　　IMPACT　　　　　　　　　　FLIGHT (58) Field of Classification Search
CPC .......... B60G 2204/4222; B64C 25/001; B64C 25/34; B64C 25/36; B64C 25/62; B64C 2025/008
See application file for complete search history.

(56) References Cited

U.S. PATENT DOCUMENTS

| | | | |
|---|---|---|---|
| 1,083,864 A | 1/1914 | Shailer | |
| 1,133,973 A | 3/1915 | Koch | |
| 1,189,963 A | 7/1916 | Jones | |
| 1,193,733 A | 8/1916 | Stringfellow et al. | |
| 1,267,876 A | 8/1916 | Stringfellow | |
| 1,397,839 A | 11/1921 | Arthur | |
| 1,416,078 A | 5/1922 | Columbus | |
| 1,468,714 A | 9/1923 | Grossman | |
| 1,495,699 A | 5/1924 | U-Hyoe | |
| 1,584,679 A | 5/1926 | Stoltz | |
| 1,672,090 A | 6/1928 | Ringstod | |
| 1,673,056 A | 6/1928 | Stoltz | |
| 1,979,935 A | 11/1934 | Henap | |
| 2,238,410 A | 4/1941 | Capuciati | |
| 2,375,705 A | 5/1945 | Starneno | |
| 2,639,140 A | 5/1953 | Meyer | |
| 3,896,868 A | 7/1975 | Molitor | |
| 4,310,149 A | 1/1982 | Camilleri | |
| 4,465,321 A | 8/1984 | Berg | |
| 4,782,875 A | 11/1988 | Jones | |
| 4,840,357 A | 6/1989 | Jouade | |
| 4,872,651 A | 10/1989 | Thorn | |
| 4,903,792 A | 2/1990 | Ze-Ying | |
| 5,104,201 A | 4/1992 | Ross | |
| 5,141,173 A * | 8/1992 | Lay | B60F 5/02 180/117 |
| D401,204 S * | 11/1998 | Al-Sabah | D12/204 |
| 6,041,838 A | 3/2000 | Al-Sabah | |
| 6,257,604 B1 | 7/2001 | Laurent et al. | |
| 6,357,770 B1 | 3/2002 | Carpiaux et al. | |
| 6,386,529 B2 | 5/2002 | Bik et al. | |
| 6,588,473 B1 | 7/2003 | Walrond | |
| 6,698,480 B1 | 3/2004 | Cornellier | |
| 6,991,076 B2 | 1/2006 | McAndrews | |
| 7,441,757 B2 | 10/2008 | Slemer et al. | |
| 7,537,228 B2 | 5/2009 | Shimizu et al. | |
| 7,699,326 B2 | 4/2010 | Yamada | |
| 7,810,533 B2 | 10/2010 | Wichern | |
| 7,874,512 B2 * | 1/2011 | Xu | B60F 5/02 244/2 |
| 8,037,957 B2 | 10/2011 | Laurent | |
| 8,127,810 B2 | 3/2012 | Wichern | |
| 8,240,689 B2 | 8/2012 | Holt et al. | |
| 8,863,794 B2 | 10/2014 | Wichern | |
| 2006/0012144 A1 | 1/2006 | Kunzler et al. | |
| 2010/0218865 A1 | 9/2010 | Kim | |
| 2010/0219572 A1 | 9/2010 | Back | |
| 2011/0209938 A1 * | 9/2011 | Basadzishvili | B60G 3/01 180/305 |
| 2013/0312464 A1 | 11/2013 | Davis | |
| 2013/0340902 A1 | 12/2013 | Kemeny | |
| 2014/0034198 A1 | 2/2014 | Wichern | |
| 2014/0060715 A1 * | 3/2014 | Winshtein | B60B 9/005 152/7 |

FOREIGN PATENT DOCUMENTS

| | | |
|---|---|---|
| DE | 235200 C | 6/1911 |
| DE | 3222262 A1 | 12/1983 |
| DE | 19983290 T1 | 6/2001 |
| DE | 102005032537 A1 | 1/2007 |
| EP | 0432079 A2 | 6/1991 |
| EP | 1029711 A2 | 8/2000 |
| FR | 351455 A | 7/1905 |
| FR | 464426 A | 3/1914 |
| FR | 614407 A | 12/1926 |
| FR | 730768 A | 8/1932 |
| FR | 1105719 | 12/1955 |
| FR | 2795947 | 1/2001 |
| FR | 2898077 A1 | 9/2007 |
| GB | 191211637 | 1/1912 |
| GB | 191124962 | 4/1912 |
| GB | 191217140 A | 5/1913 |
| GB | 191306920 A | 7/1913 |
| GB | 1549611 A | 8/1979 |
| GB | 2188596 A | 10/1987 |
| GB | 2331966 A | 6/1999 |
| JP | S61207202 A | 9/1986 |
| JP | H04368203 A | 12/1992 |
| WO | 9715461 A1 | 5/1997 |
| WO | 0176351 A1 | 10/2001 |
| WO | 2005007497 A1 | 1/2005 |
| WO | 2006128291 A1 | 12/2006 |
| WO | 2009029990 A1 | 3/2009 |
| WO | 2012153170 A1 | 11/2012 |
| WO | 2013061121 A1 | 5/2013 |

OTHER PUBLICATIONS

International Search Report for International Application No. PCT/IB2012/000100 dated Jun. 18, 2012.

* cited by examiner

LANDING GEAR APPARATUSES AND APPLICATIONS THEREOF

RELATED APPLICATION

This application claims the benefit of priority under 35 USC 119(e) of U.S. Provisional Patent Application No. 61/950,664, filed Mar. 10, 2014, entitled "LANDING GEAR WITH IN-WHEEL SUSPENSION", the contents of which are incorporated herein by reference in their entirety.

FIELD OF THE INVENTION

The present invention, in some embodiments thereof, relates to landing gear apparatuses and applications thereof, particularly regarding landing gear apparatuses whose wheels include embedded (in-wheel) relatively high magnitude impact shock absorbing capabilities. Exemplary landing gear apparatuses of the present invention are landing gear assemblies, and a wheel hub positioning mechanism, exemplary embodiments of which are included in the disclosed landing gear assemblies.

BACKGROUND OF THE INVENTION

Landing gear typically refers to the undercarriage (and parts thereof, including, for example, suspension systems) of an aircraft or spacecraft. In the context of the present disclosure, landing gear may also refer to the undercarriage (and parts thereof) of an air droppable vehicle. For aircraft, landing gear (suspension system) supports the craft when it is not flying, allowing it to take off, land, and be taxied without damage to the craft. Some landing gears include skids, skis, or floats. In the context of the present disclosure, landing gear includes at least one wheel, coverable by, or attachable to, a wheel covering, such as a tire.

Landing impacts create severe traumas to landing gears (or parts thereof), making them prone to occasional replacements or/and continuous maintenance involving disassemblies of the landing gear (or parts thereof). In scenarios involving landings of air droppable vehicles, such vehicles are usually designed only for land travel and not for absorbing high magnitude impact shocks which typically occur in air drops. Use of parachutes connected to air droppable vehicles, for effecting air landings thereof, has both mechanical and operational limitations.

Exemplary teachings and practices of wheel suspension and damping equipment, particularly suitable for (non-air bound) land travel type vehicles, by the same applicant/assignee of the present disclosure, are provided in WIPO PCT Pat. Appl. Int'l. Pub. Nos.: WO 2014/170745; WO 2013/061121; WO 2012/153170; and WO 2012/104691.

SUMMARY OF THE INVENTION

The present invention, in some embodiments thereof, relates to landing gear apparatuses and applications thereof, particularly regarding landing gear apparatuses whose wheels include embedded (in-wheel) relatively high impact shock absorbing capabilities. Exemplary landing gear apparatuses of the present invention are landing gear assemblies, and a wheel hub positioning mechanism, exemplary embodiments of which are included in the disclosed landing gear assemblies.

According to an aspect of some embodiments of the present invention, there is provided a landing gear assembly, comprising: a wheel, comprising a wheel rim connected to a wheel hub, the wheel rim encompasses a wheel rim inner boundary and has a wheel rim inner radius, the wheel hub is movable and positionable in space surrounded by the wheel rim inner boundary, to a nominal position located within the space; a wheel hub positioning mechanism, connected to the wheel hub, and configured to selectively confine and position the wheel hub within the space to a pre-determined position different from the nominal position; and a wheel hub suspension assembly, connected to the wheel hub, and operable in response to the wheel hub moving relative to the pre-determined position, the wheel hub suspension assembly comprises a damper configured to absorb a shock or/and dissipate kinetic energy during the wheel hub motion; wherein when the wheel is subjected to a shock associated with a landing impact of at least 2 meters-per-second vertical velocity, the wheel hub moves from or across the pre-determined position towards the wheel rim inner boundary, along a wheel hub maximal shifting path whose length is greater than the wheel rim inner radius.

According to some embodiments of the invention, the wheel hub positioning mechanism is configured to continuously confine and position the wheel hub within the space to the pre-determined position.

According to some embodiments of the invention, the wheel hub positioning mechanism is configured to lock the wheel hub at the predetermined position.

According to some embodiments of the invention, the wheel hub positioning mechanism includes a directional locking member configured to allow the wheel hub passing therethrough in a first direction, and to prevent the wheel hub from passing therethrough in a second direction opposite to the first direction.

According to some embodiments of the invention, the pre-determined position is, or is adjacent to, center point located within the space of the wheel rim.

According to some embodiments of the invention, the nominal position is, or is adjacent to, center point located within the space of the wheel rim.

According to some embodiments of the invention, the wheel hub suspension assembly includes at least one component connected between the wheel rim and the wheel hub.

According to some embodiments of the invention, the wheel hub suspension assembly includes at least one component connected to inside of the wheel hub.

According to some embodiments of the invention, the landing gear assembly is housed within a landing vehicle, wherein the wheel hub suspension assembly includes at least one component connected to the landing vehicle.

According to some embodiments of the invention, the wheel hub suspension assembly includes at least one in-wheel damper configured and operative inside of the space of the wheel rim, and at least one out-wheel damper configured and operative outside of the space of the wheel rim.

According to some embodiments of the invention, the wheel hub suspension assembly is configured such that both the in-wheel damper and the out-wheel damper actuate upon the wheel hub moving away from the pre-determined position.

According to some embodiments of the invention, the wheel hub suspension assembly is configured such that the out-wheel damper actuates in response to actuation of the in-wheel damper.

According to some embodiments of the invention, the damper includes, or is coupled with, a spring or spring-like member, whereby, upon the wheel hub moving away from the pre-determined position, the spring or spring-like member exhibits damping oscillations.

According to some embodiments of the invention, the maximal wheel hub shifting path is part of a complete wheel hub travel circuit starting from the pre-determined position located inside first half of the space relative to center plane of the space, continuing to an interim position located inside opposite second half of the space, and ending at the nominal position.

According to some embodiments of the invention, the maximal wheel hub shifting path is part of a complete wheel hub travel circuit starting from the nominal position located inside first half of the space relative to center plane of the space, continuing to an interim position located inside opposite second half of the space, and ending at the pre-determined position.

According to some embodiments of the invention, the wheel hub maximal shifting length is at least 100 mm.

According to some embodiments of the invention, the landing gear assembly is connectable to, or part of, a landing vehicle.

According to some embodiments of the invention, the landing vehicle is selected from the group consisting of an airplane, a drone, a glider, a helicopter, a powered parachute, and an air droppable vehicle.

According to an aspect of some embodiments of the present invention, there is provided a landing gear assembly, comprising: a first wheel, comprising a first wheel rim encompassing a first wheel rim inner boundary and a first wheel hub movable and positionable in a first space surrounded by the first wheel rim inner boundary; a second wheel, adjacent to the first wheel, and comprising a second wheel rim encompassing a second wheel rim inner boundary and a second wheel hub movable and positionable in a second space surrounded by the second wheel rim inner boundary; a rigid member, fixedly connected to the first wheel hub and to the second wheel hub, in a form of a wheel cluster; and at least one wheel hub suspension assembly, connected to the wheel cluster, and comprising at least one damper; wherein the at least one wheel hub suspension assembly is configured to absorb a shock or/and dissipate kinetic energy during motion of the second wheel hub in the second space followed by motion of the first wheel hub in the first space.

According to some embodiments of the invention, the at least one wheel hub suspension assembly comprises a first wheel hub suspension assembly including a first damper, and a second wheel hub suspension assembly including a second damper, wherein the first damper is configured to absorb a shock or/and dissipate kinetic energy during motion of the first wheel hub in the first space, and the second damper is configured to absorb a shock or/and dissipate kinetic energy during motion of the second wheel hub in the second space.

According to some embodiments of the invention, the landing gear assembly is configured and operative such that the first wheel contacts ground immediately before or upon the second damper attains a maximal damping capacity thereof.

According to some embodiments of the invention, the landing gear assembly is configured and operative such that the first damper reacts to a landing impact only after the second damper reacts to the landing impact.

According to some embodiments of the invention, the landing gear assembly is configured and operative such that the first wheel hub and the second hub reach same height relative to ground during or/and after downward motion of the first and second wheels towards the ground.

According to some embodiments of the invention, the landing gear assembly is configured and operative such that the first wheel hub is concentric with the first wheel rim and the second wheel hub is concentric with the second wheel rim following completion of the at least one wheel hub suspension assembly absorbing the shock or/and dissipating kinetic energy.

According to some embodiments of the invention, the rigid member is connectable or connected to a landing vehicle.

According to some embodiments of the invention, the landing gear assembly is connected to the landing vehicle, wherein the first wheel and the second wheel are sequentially spatially arranged relative to a longitudinal axis of the landing vehicle, such that the first wheel is in front of the second wheel relative to the landing vehicle.

According to some embodiments of the invention, the landing gear assembly is connected to the landing vehicle, wherein the first wheel is maintained raised relative to the second wheel such that the first wheel is closer to the landing vehicle before the first wheel is subjected to a landing impact.

According to some embodiments of the invention, the second wheel is heavier than the first wheel.

According to some embodiments of the invention, the wheel cluster comprises at least one additional wheel connected to the rigid member.

All technical or/and scientific words, terms, or/and phrases, used herein have the same or similar meaning as commonly understood by one of ordinary skill in the art to which the invention pertains, unless otherwise specifically defined or stated herein. Methods, materials, and examples described herein are illustrative only and are not intended to be necessarily limiting. Although methods or/and materials equivalent or similar to those described herein can be used in practicing or/and testing embodiments of the invention, exemplary methods or/and materials are described below. In case of conflict, the patent specification, including definitions, will control.

Implementation of some embodiments of the invention can involve performing or completing selected tasks manually, automatically, or a combination thereof. Moreover, according to actual instrumentation and equipment of some embodiments of the invention, several selected tasks could be implemented by hardware, by software, by firmware, or a combination thereof, using an operating system.

For example, hardware for performing selected tasks according to embodiments of the invention could be implemented as a chip, as a circuit, or a combination thereof. As software, selected tasks of some embodiments of the invention could be implemented as a plurality of software instructions being executed by a computer using any suitable operating system. In an exemplary embodiment of the invention, one or more tasks of exemplary embodiments of the method and/or system as described herein are performed by a data processor, such as a computing platform for executing a plurality of instructions. Optionally, the data processor includes a volatile memory for storing instructions or/and data. Alternatively or additionally, optionally, the data processor includes a non-volatile storage, for example, a magnetic hard-disk or/and removable media, for storing instructions or/and data. Optionally, a network connection is provided as well. Optionally, a display or/and a user input device such as a keyboard or mouse is provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to landing gear apparatuses and applications thereof, particularly regarding landing gear apparatuses whose wheels include embedded (in-wheel) relatively high impact shock absorbing capabilities. Exemplary landing gear apparatuses of the present invention are landing gear assemblies, and a wheel hub positioning mechanism, exemplary embodiments of which are included in the disclosed landing gear assemblies.

The following disclosure may be described in the context of landing gears of landing vehicles such as aircrafts and air droppable vehicles. However, the invention is not limited to the specifically described landing gear apparatuses and applications thereof, and may be adapted to various applications without departing from the overall scope of the invention. As such, the present disclosure may relate also to other applications involving high energy absorptions including, but not limited to, anti-bomb car seats, remotely controlled vehicles, ejector seats, loading equipment (e.g., casters), and others.

The term 'landing vehicle', as used herein, refers to any type of wheeled device or equipment having an aerodynamic related element such as a wing or a parachute, such as any type of aircraft, including, but not limited to, an airplane, a drone, a glider, a helicopter, or a powered parachute, as well as an air droppable vehicle, such as an airborne all-terrain vehicle.

The terms 'landing gear' and 'landing gear assembly', as used herein, refer to the undercarriage of a landing vehicle. In exemplary embodiments of the present disclosure, the landing gear assembly includes at least one wheel and a suspension assembly provided in the wheel or/and between the wheel and a landing vehicle.

The terms 'suspension' and 'wheel hub suspension assembly', as used herein, refers to an assembly of springs, spring-like members, dampers, or/and linkages that connects a vehicle to its wheels and allows relative motion between the two. Although a suspension assembly also serve to improve "road holding" of many types of vehicles, in exemplary embodiments of the present disclosure, the wheel hub suspension assembly is configured for improve isolation of the landing vehicle from disturbances affecting an unsprung weight (e.g., a wheel linked thereto) and/or positively affect magnitude and/or frequency of such disturbances with respect to safety and comfort considerations.

The term 'damping', as used herein, may be interpreted as to absorbing and/or transforming of energy, such as kinetic energy, produced by impact of forces, to other forms of energy, and most notably to heat. A "damper", which may also be coined as shock absorber or dashpot, may be considered as a mechanical device designed to restrain or smooth out shock impulses and/or vibrations, and dissipate kinetic energy, for example to heat. Damping may be relevant to shocks and/or to vibrations. Damping may be any type of controlling, changing, allocating, dissipating and/or containing kinetic and/or potential energy gained or absorbed and/or to any lessening or restraining of such effect to the rotating mass, and may include but not be limited to: shock absorbing, suspension, friction and hysteresis of structural materials. A damper may use different materials such as viscoelastic materials, metals and/or polymers, and may use friction such as of solids, fluids or gases. A mechanical damper commonly includes or is coupled with a spring and is configured to damp oscillations of the spring.

In some embodiments, damping is achieved by employing the principle of fluid friction, for example by passing a portion of fluid volume through a constriction, such as any thin portion, narrowing, orifice, nozzle, and or any other constraint or friction or turbulence encouraging element that the fluid encounters along its flow passage, optionally along a channel between two or more chambers or reservoirs.

The terms 'spring' and 'spring-like member', as used herein, refer to a mechanical member or element, usually elastic (i.e., returns to its shape or position when pushed or pulled or pressed), which is configured to store kinetic energy and/or extend the impact duration that may be transferred to a landing vehicle connected to the suspension and/or landing gear. A spring or spring-like member is usually substantially less effective or totally incapable of absorbing and/or dissipating the kinetic energy as a damper, unless the spring or spring-like member has damping capabilities such as in case of hydraulic or pneumatic springs having a piston with at least one constriction, or/and a spring or spring-like member that creates friction or hysteresis during motion (e.g., oscillations). The latter types of springs, having damping capabilities, may be considered dampers.

The present disclosure, in some embodiments thereof, relates to landing gear assemblies, and optionally, to landing gear assemblies that include wheels having embedded shock absorbing capabilities. According to an aspect of the present disclosure, there is provided a landing gear assembly connected or connectable to a landing vehicle. The landing gear assembly includes a wheel, which includes a wheel rim connected to a wheel hub. The wheel rim encompasses a wheel rim inner boundary and has a wheel rim inner radius. The wheel hub is movable and positionable in space surrounded by the wheel rim inner boundary, to a nominal position located within the space.

In some embodiments, the landing gear assembly further includes a wheel hub positioning mechanism, connected to the wheel hub, and configured to selectively confine and position the wheel hub within the space to a pre-determined position different from the nominal position.

In some embodiments, the landing gear assembly further includes a wheel hub suspension assembly, connected to the wheel hub, and operable in response to the wheel hub moving relative to the pre-determined position. The wheel hub suspension assembly may include a damper configured to absorb a shock or/and dissipate kinetic energy during wheel hub motion.

In some embodiments, the wheel is subjected to a shock associated with a landing impact of at least 1 meters-per-second vertical velocity, optionally at least 2 m/s, optionally at least 4 m/s, optionally at least 10 m/s, or higher, or lower, or an intermediate velocity. In some embodiments, such a landing impact moves the wheel hub, in accordance with the landing gear assembly configuration, from or across the pre-determined position towards the wheel rim inner boundary, along a wheel hub maximal shifting path whose length is greater than the wheel rim inner radius.

The suspension includes a damper that is configured to absorb a shock and/or dissipate kinetic energy during motion of the wheel hub in the space surrounded by the rim inner boundary. The damper may include or be coupled with a spring and configured to damp oscillations of the spring, particularly upon the landing impact. A plurality of dampers and/or springs may be provided between the wheel hub and the wheel rim, optionally evenly spaced around the outer boundary of the wheel hub.

According to the present disclosure, the landing vehicle may be an aircraft such as an airplane, a drone, a glider, a helicopter or a powered parachute, or it may an air droppable vehicle such as an airborne ATV (all-terrain vehicle).

Figure 1:
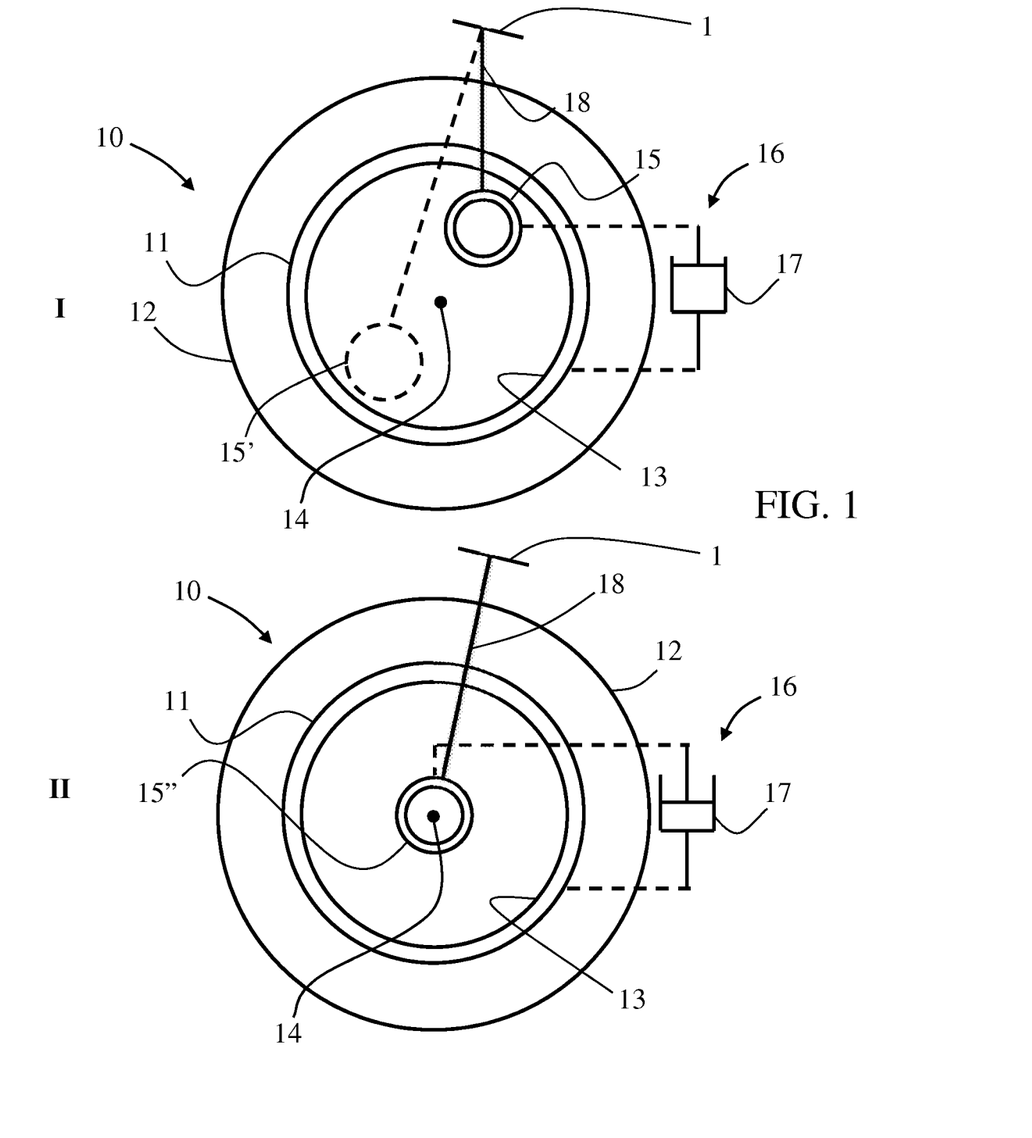
FIG. 1 schematically illustrates side views of exemplary embodiments of a landing gear assembly, particularly highlighting an exemplary embodiment of a wheel hub positioning mechanism connected to only the wheel hub, during (I) and after (II) reaction to a landing impact, in accordance with some embodiments of the invention.

Referring now to the drawings, FIG. 1 schematically illustrates side views of exemplary embodiments of a landing gear assembly 10 with a wheel hub suspension assembly 16 during (I) and after (II) reaction to a landing impact. The landing gear assembly 10 is connectable or connected to a portion 1 of a more encompassing landing gear system of a landing vehicle, such as an aircraft (e.g., airplane), a helicopter, a powered parachute, or an air droppable vehicle (e.g., attached to a parachute).

Landing gear assembly 10 includes a wheel rim 11, shown attached to a tire 12, including a wheel rim inner boundary 13 encircling a rim center 14, and a wheel hub 15 movable in the space surrounded by wheel rim inner boundary 13.

Wheel hub suspension assembly 16 includes a damper 17 configured to absorb a shock and/or dissipate kinetic energy during motion of wheel hub 15 in the space surrounded by wheel rim inner boundary 13. As shown, wheel hub suspension assembly 16 includes at least one component (in this example, at least damper 17) connected between wheel hub 15 and wheel rim 11. Optionally and additionally, wheel hub suspension assembly 16 includes at least one component connected between landing gear assembly 10 and landing vehicle 1.

In some embodiments, landing gear assembly 10 includes a wheel hub positioning mechanism 18 for supporting a particular position of wheel hub 15 (with respect to wheel rim 11 and landing vehicle 1). In the example shown in FIG. 1, wheel hub 15 travels to a new position 15' upon the landing impact but eventually rebounds or rests to a final position 15" being concentric with wheel rim 11.

Figure 2:
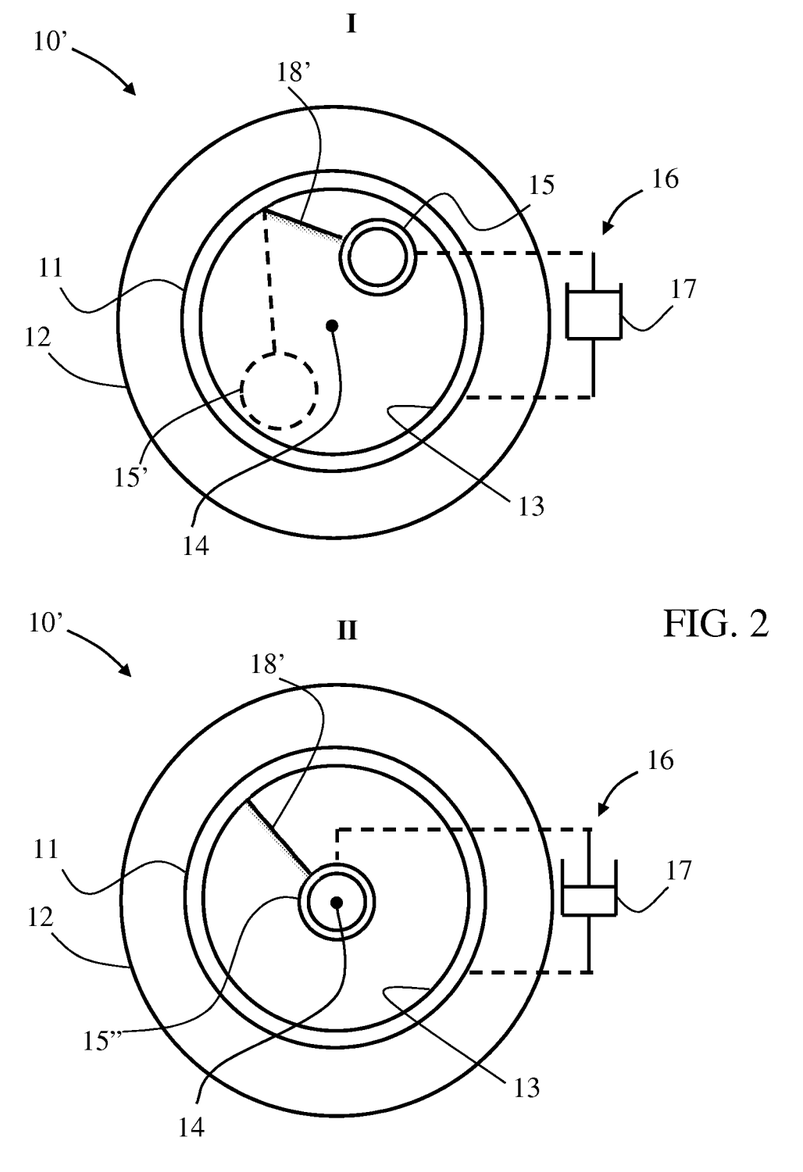
FIG. 2 schematically illustrates side views of exemplary embodiments of a landing gear assembly, particularly highlighting an exemplary embodiment of a wheel hub positioning mechanism connected to both the wheel hub and the wheel rim inner boundary, during (I) and after (II) reaction to a landing impact, in accordance with some embodiments of the invention.

FIG. 2 schematically illustrates side views of exemplary embodiments of a landing gear assembly 10', which is structurally and functionally identical to landing gear assembly 10, other than having a different wheel hub positioning mechanism 18' connected to both the wheel hub 15 and the wheel rim inner boundary 13, during (I) and after (II) reaction to a landing impact.

Figures 3A, 3B:
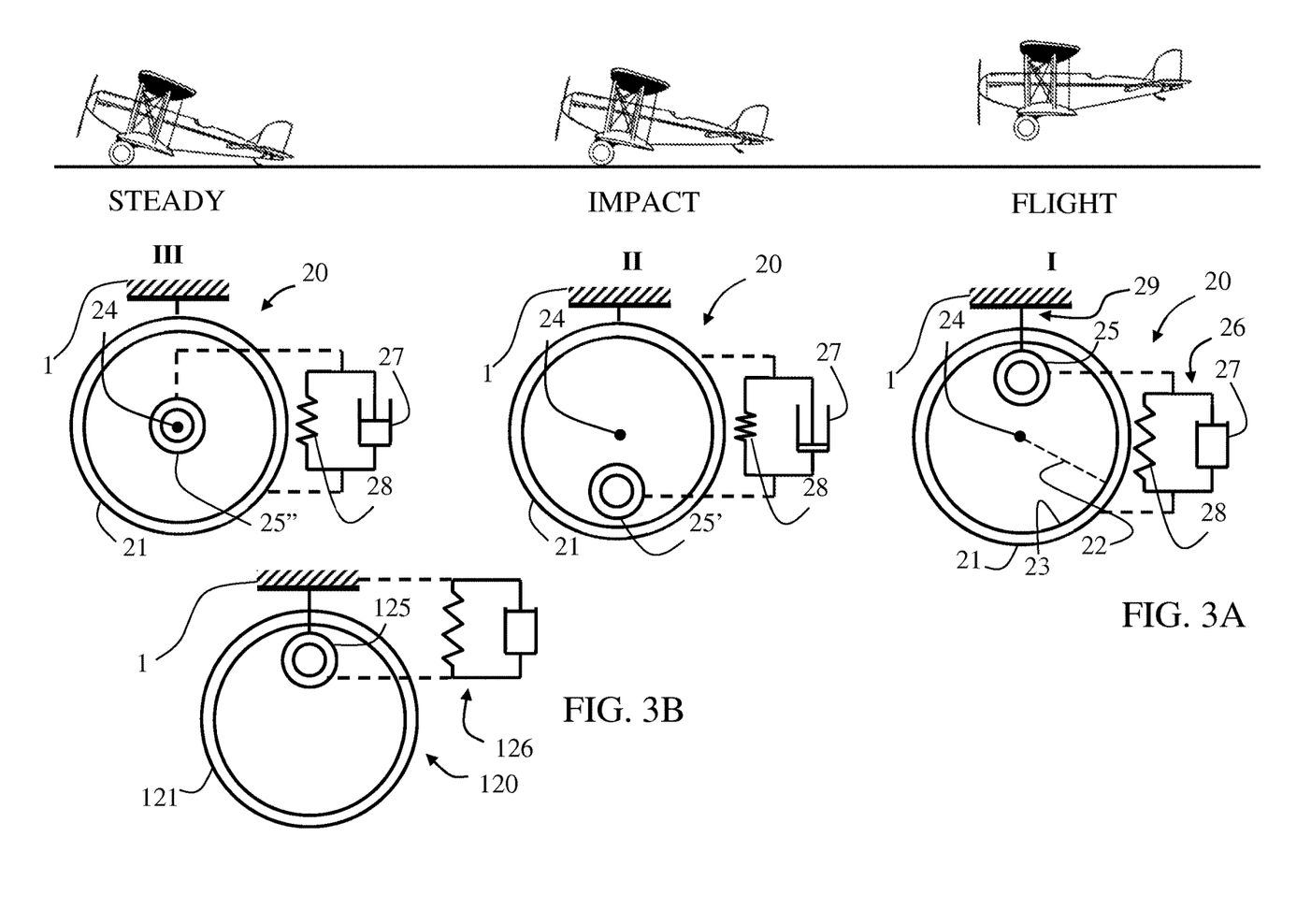
FIGS. 3A-3B schematically illustrate exemplary embodiments of another exemplary landing gear assembly in different landing scenarios I, II and III (FIG. 3A), and a variation thereof (FIG. 3B), in accordance with some embodiments of the invention.

FIG. 3A schematically illustrates exemplary embodiments of a landing gear assembly 20 in different landing scenarios: "Flight" (I), "Impact" (II) and "Steady state" (III). Landing gear assembly 20 includes a wheel hub suspension assembly in a form of an in-wheel suspension 26 shown during and after reaction to a landing impact. Landing gear assembly 20 is connected or connectable to a portion 1 of a landing vehicle, which may be an aircraft or an air droppable vehicle. Landing gear assembly 20 includes wheel having a wheel rim 21 connected to a wheel hub. The wheel rim 21 encompasses a wheel rim inner boundary 23 and has a wheel rim center 24 and a wheel rim inner radius 22. Wheel hub 25 is movable in the space surrounded by wheel rim inner boundary 23.

Wheel hub suspension assembly 26 includes a damper 27 configured to absorb a shock and/or dissipate kinetic energy during motion of wheel hub 25 in the space surrounded by wheel rim inner boundary 23. Damper 27 includes or is coupled with a spring 28 and is configured to damp oscillations thereof. In some embodiments, the wheel is subjected to a shock associated with a landing impact of at least 1 meters-per-second vertical velocity, optionally at least 2 m/s, optionally at least 4 m/s, optionally at least 10 m/s, or higher, or lower, or an intermediate velocity. In some embodiments, such a landing impact moves wheel hub 25, in accordance with landing gear assembly 20 configuration, from or across a pre-determined position (shown in Scenario I) towards the wheel rim inner boundary (shown in scenario II), along a wheel hub maximal shifting path whose length is greater than wheel rim inner radius 22.

As shown, wheel hub suspension assembly 26 includes at least one component (in this example, damper 27 and spring 28) connected between wheel hub 25 and wheel rim 21. Optionally and additionally, wheel hub suspension assembly 26 includes at least one component connected between landing gear assembly 20 and landing vehicle portion 1 (not shown).

Landing gear assembly 20 includes a wheel hub positioning mechanism 29, optionally including a selectively operable actuator, connected to wheel hub 25, and configured to selectively confine and position the wheel hub within the space to the pre-determined position (I). In some embodiments, wheel hub suspension assembly 26 is operable in response to wheel hub 25 motion relative to the pre-determined position (such as a wheel hub 25 moving to the position shown in scenario II).

As shown in the "flight" scenario (I), wheel hub 25 is selectively locked to a high position above wheel rim center 24 in approximation to the landing vehicle portion 1, using wheel hub positioning mechanism 29. Immediately before the landing impact or upon impact, wheel hub 25 is optionally released and allowed to travel to a different position within rim 21. Upon the landing impact, shown in the "impact" scenario (II), landing gear assembly 20 is configured such that wheel hub 25 travels a maximal shifting length from the high position to a point below the rim center (illustrated as position 25' in the "impact" scenario) before bouncing back towards rim center 24. The maximal shifting length may be greater than rim inner radius 22, optionally equal to or greater than 10 mm, optionally equal to or greater than 30 mm, optionally equal to or greater than 100 mm, optionally equal to or greater than 150 mm, optionally equal to or greater than 200 mm, or higher, or lower, or an intermediate length.

In some embodiments, wheel rim suspension assembly 26 acts also as a positioning apparatus for supporting a particular position of wheel hub 25, and particularly configured to continuously force wheel hub 25 towards concentricity with wheel rim 21. As shown, at the "flight" scenario damper 27 is ready for dissipating energy during a full travel of wheel hub 25 along a maximal shifting length, while spring 28 is stressed and acts to reposition wheel hub 25 downward towards wheel rim center 24 (yet wheel hub is locked to the high position). At the "impact" scenario, following wheel hub 25 full travel to position 25', damper 27 is optionally ready to a reverse travel (optionally facilitating kinetic energy dissipation as a rebound travel of wheel hub 25) while spring 28 is stressed and acts to reposition hub 25 upward towards wheel rim center 24. At the "steady" scenario, spring 28 is unstressed and provided in its nominal state (which may be unstressed or preloaded rotationally symmetrically).

In some embodiments, at the "steady" position, landing gear assembly 20 is configured such that suspension 26 can absorb shocks, such as during land travel of the landing vehicle, when the wheel rotates about wheel rim center 24. In some embodiments, wheel rim suspension assembly 26 offers a substantially homogenous (e.g., rotationally symmetric) shock absorption capability 360° around wheel rim center 24, notwithstanding shock origin at wheel rim 21 periphery and/or shock direction. In some embodiments, wheel rim suspension assembly 26, at least when at the "steady" position, is selective and reacts to shocks only above a predetermined threshold, optionally by being rotationally symmetrically preloaded.

FIG. 3B schematically illustrates an exemplary embodiment of a landing gear assembly 120, which a variation to landing gear assembly 20, differentiated particularly by including a wheel rim suspension assembly 126 which, unlike wheel rim suspension assembly 26 being in a form of in-wheel suspension, connects a wheel hub 125 to landing vehicle portion 1 rather than directly to a wheel rim 121, therefore acting in response to relative motions therebetween.

Figures 4A, 4B:
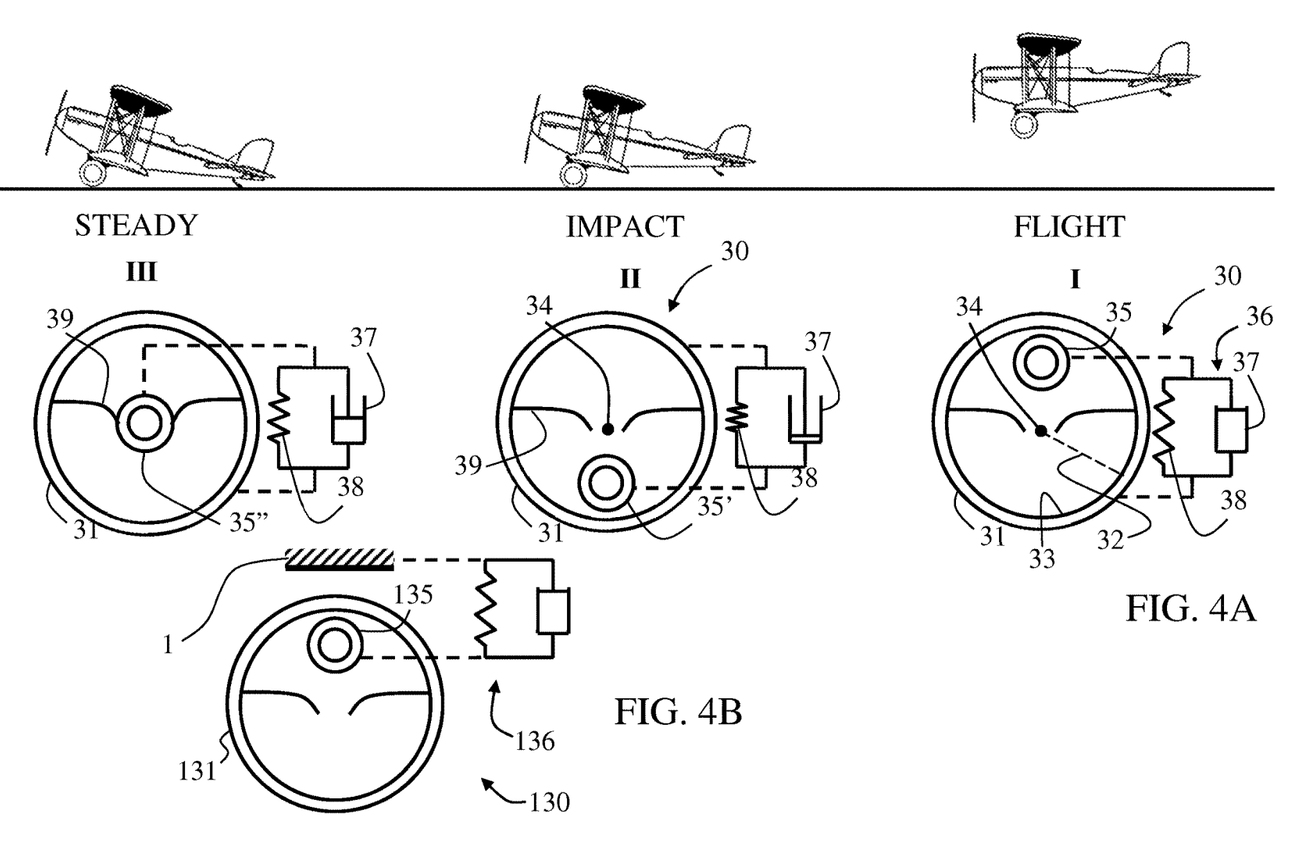
FIGS. 4A-4B schematically illustrate exemplary embodiments of another exemplary landing gear assembly in different landing scenarios I, II and III (FIG. 4A), and a variation thereof (FIG. 4B), in accordance with some embodiments of the invention.

FIG. 4A schematically illustrates exemplary embodiments of a landing gear assembly 30 in different landing scenarios: "Flight" (I), "Impact" (II) and "Steady state" (III). Landing gear assembly 30 includes a wheel hub suspension assembly in a form of an in-wheel suspension 36 shown during and after reaction to a landing impact. Landing gear assembly 30 is connected or connectable to a portion 1 of a landing vehicle, which may be an aircraft or an air droppable vehicle. Landing gear assembly 30 includes a wheel having a wheel rim 31. The wheel rim 31 encompasses a wheel rim inner boundary 33 and has a wheel rim center 34 and a wheel rim inner radius 32. Wheel hub 35 is movable in the space surrounded by wheel rim inner boundary 33.

Wheel hub suspension assembly 36 includes a damper 37 configured to absorb a shock and/or dissipate kinetic energy during motion of wheel hub 35 in the space surrounded by wheel rim inner boundary 33. Damper 37 includes or is coupled with a spring 38 and is optionally configured to damp oscillations thereof. In some embodiments, the wheel is subjected to a shock associated with a landing impact of at least 1 meters-per-second vertical velocity, optionally at least 2 m/s, optionally at least 4 m/s, optionally at least 10 m/s, or higher, or lower, or an intermediate velocity. In some embodiments, such a landing impact moves wheel hub 35, in accordance with landing gear assembly 30 configuration, from or across a pre-determined position (shown in Scenario I) towards the wheel rim inner boundary (shown in scenario II), along a wheel hub maximal shifting path whose length is greater than wheel rim inner radius 32. As shown, wheel hub suspension assembly 36 includes at least one component (in this example, damper 37 and spring 38) connected between wheel hub 35 and wheel rim 31. Optionally and additionally, wheel hub suspension assembly 36 includes at least one component connected between landing gear assembly 30 and landing vehicle portion 1 (not shown).

Landing gear assembly 30 includes a wheel hub positioning mechanism 39 connectable to wheel hub 35, and, once fixedly connected thereto, is configured to selectively confine and position the wheel hub within the space to a pre-determined position (III). In some embodiments, wheel hub positioning apparatus 39 is in a form of a unidirectional locking member and is configured to allow wheel hub 35 to pass therethrough when traveling from the high position to below wheel rim center 34 and to withhold wheel hub 35 from passing therethrough above the wheel rim center 34.

As shown in the "flight" scenario (I), wheel hub 35 is maintained at a high position above wheel rim center 34 in approximation to the landing vehicle portion 1, optionally using spring 38. landing gear assembly 30 is configured such that upon landing impact, as shown in the "impact" scenario (II), wheel hub 35 travels a maximal shifting length from the high position to a point below wheel rim center 34 (illustrated as position 35' in the "impact" scenario) before bouncing back towards rim center 34, namely, the predetermined position 35" confined by wheel hub positioning mechanism 39. The maximal shifting length may be greater than wheel rim inner radius 32, optionally equal to or greater than 10 mm, optionally equal to or greater than 30 mm, optionally equal to or greater than 100 mm, optionally equal to or greater than 150 mm, optionally equal to or greater than 200 mm, or higher, or lower, or an intermediate length.

In some embodiments, wheel rim suspension assembly 36 acts also as a positioning apparatus for supporting a particular position of wheel hub 35, and particularly configured to continuously force wheel hub 35 towards the high position above rim center 34 towards the landing vehicle. Optionally and additionally, wheel hub 35 is selectively lockable to wheel rim center 34 at position 35".

As shown, at the "flight" scenario (I), damper 37 is ready for dissipating energy during a full travel of hub 35 along a maximal shifting length, while spring 38 is unstressed and/or kept preloaded and resists repositioning of wheel hub 35 downward towards wheel rim center 34. At the "impact scenario" (II), following wheel hub 35 full travel to position 35', damper 37 is optionally ready to a reverse travel (optionally facilitating kinetic energy dissipation as a rebound travel of hub 35) while spring 38 is stressed and acts to reposition wheel hub 35 upward towards the high position above wheel rim center 34. At the "steady" scenario (III), spring 38 is stressed yet wheel hub positioning mechanism 39 confines wheel hub 35 and holds it at position 35″ at or substantially adjacent wheel rim center 34.

In some embodiments, at the "steady" position, landing gear assembly 30 is configured such that wheel rim suspension assembly 36 can absorb shocks, such as during land travel of the landing vehicle, when the wheel rotates about wheel rim center 34. In some embodiments, wheel rim suspension assembly 36 offers a substantially homogenous (e.g., rotationally symmetric) shock absorption 360° around wheel rim center 34, notwithstanding shock origin at wheel rim 31 periphery, or shock direction. In some embodiments, wheel rim suspension assembly 36, at least when at the "steady" position, is selective and reacts to shocks only above a predetermined threshold, optionally by being rotationally symmetrically preloaded.

FIG. 4B schematically illustrates an exemplary embodiment of a landing gear assembly 130, which a variation to landing gear assembly 30, differentiated particularly by including a wheel rim suspension assembly 136 which, unlike wheel rim suspension assembly 36 being in a form of in-wheel suspension, connects a wheel hub 135 to landing vehicle portion 1 rather than directly to a wheel rim 131, therefore acting in response to relative motions therebetween.

Figures 5A, 5B:
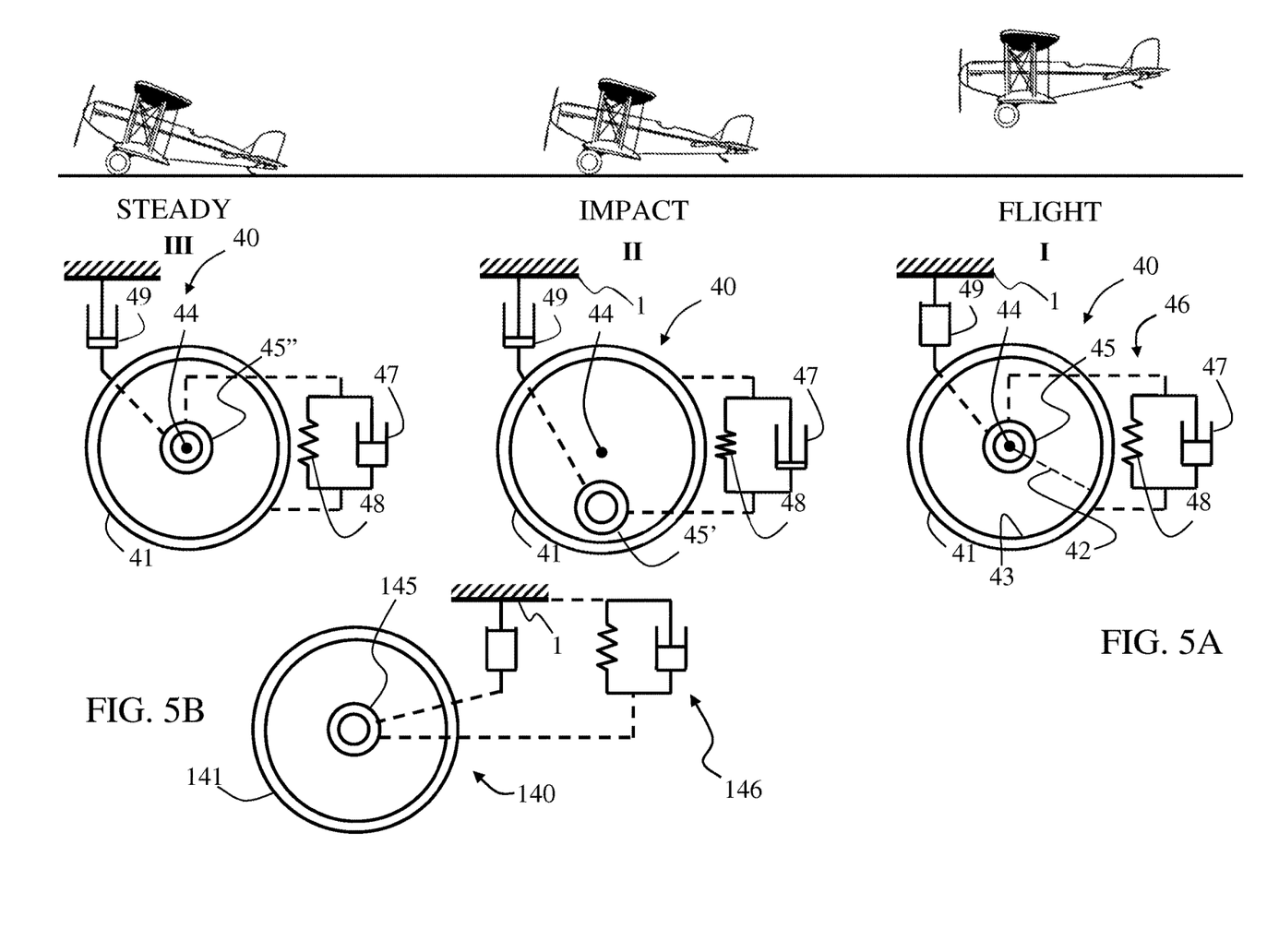
FIGS. 5A-5B schematically illustrate exemplary embodiments of another exemplary landing gear assembly in different landing scenarios I, II and III (FIG. 5A), and a variation thereof (FIG. 5B), in accordance with some embodiments of the invention.

FIG. 5A schematically illustrates exemplary embodiments of a landing gear assembly 40 in different landing scenarios: "Flight" (I), "Impact" (II) and "Steady state" (III). Landing gear assembly 40 includes a wheel hub suspension assembly in a form of an in-wheel suspension 46 shown during and after reaction to a landing impact. Landing gear assembly 40 is connected or connectable to a portion 1 of a landing vehicle, which may be an aircraft or an air droppable vehicle. Landing gear assembly 40 includes a wheel rim 41, encompasses a wheel rim inner boundary 43 and has a wheel rim center 44 and a wheel rim inner radius 42. Wheel hub 45 is movable in the space surrounded by wheel rim inner boundary 43.

Wheel hub suspension assembly 46 includes at least one in-wheel damper 47 connected between wheel hub 45 and wheel rim 41 and configured to absorb a shock and/or dissipate kinetic energy during motion of wheel hub 45 in the space surrounded by wheel rim inner boundary 43. In-wheel damper 47 includes or is coupled with a spring 48 and is configured to damp oscillations thereof. Wheel hub suspension assembly 46 also includes an at least one out-wheel damper 49 connected between wheel hub 45 and landing vehicle potion 1, and configured such that in-wheel damper 47 and out-wheel damper 49 react upon the landing impact.

In some embodiments, the wheel is subjected to a shock associated with a landing impact of at least 1 meters-per-second vertical velocity, optionally at least 2 m/s, optionally at least 4 m/s, optionally at least 10 m/s, or higher, or lower, or an intermediate velocity. In some embodiments, such a landing impact moves wheel hub 45, in accordance with landing gear assembly 40 configuration, from or across a pre-determined position (shown in Scenario I) towards the wheel rim inner boundary (shown in scenario II), along a wheel hub maximal shifting path whose length is greater than wheel rim inner radius 42.

As shown in the "flight" scenario (I), wheel hub 45 is maintained at or substantially adjacent wheel rim center 44, optionally using spring 48. landing gear assembly 40 is configured such that upon landing impact, as shown in the "impact" scenario (II), wheel hub 45 travels to a point below wheel rim center 44 (illustrated as position 45′ in the "impact" scenario) before bouncing back towards wheel rim center 44. In some embodiments, wheel hub suspension assembly 46 acts also as a positioning apparatus for supporting a particular position of wheel hub 45, and particularly configured to continuously force wheel hub 45 towards wheel rim center 44.

As shown, at the "flight" scenario (I) both in-wheel damper 47 and out-wheel damper 49 are ready for dissipating energy during a downward travel of hub 45, while spring 48 is unstressed or kept preloaded and resists repositioning of wheel hub 45 downward below wheel rim center 44. At the "impact scenario" (II), following wheel hub 45 travel to position 45′, in-wheel damper 47 is optionally ready to a reverse travel (optionally facilitating kinetic energy dissipation as a rebound travel of wheel hub 45) while spring 48 is stressed and acts to reposition wheel hub 45 upward towards wheel rim center 44. In some embodiments, wheel hub suspension assembly 46 is configured such that out-wheel damper 49 reacts to the landing impact only after in-wheel damper 47 reacts to the landing impact, particularly immediately before or upon in-wheel damper 47 reaches a maximal damping capacity thereof. Optionally, out-wheel damper 49 is pre-set to lock following a maximal damping capacity thereof at least until manual release or upon a landing vehicle takeoff. At the "steady" scenario, spring 48 is unstressed (or preloaded at a nominal state) when at position 45″ at or substantially adjacent rim center 44.

In some embodiments, at the "steady" position (III), landing gear assembly 40 is configured such that wheel hub suspension assembly 46 can absorb shocks, such as during land travel of the landing vehicle, when the wheel rotates about wheel rim center 44. In some embodiments, wheel hub suspension assembly 46 offers a substantially homogenous (e.g., rotationally symmetric) shock absorption 360° around wheel rim center 44, notwithstanding shock origin at wheel rim 41 periphery, or shock direction. In some embodiments, wheel hub suspension assembly 46, at least when at the "steady" position, is selective and reacts to shocks only above a predetermined threshold, optionally by being rotationally symmetrically preloaded.

FIG. 5B schematically illustrates an exemplary embodiment of a landing gear assembly 140, which a variation to landing gear assembly 40, differentiated particularly by including a wheel rim suspension assembly 146 which, unlike wheel rim suspension assembly 46 being in a form of in-wheel suspension, connects a wheel hub 145 to landing vehicle portion 1 rather than directly to a wheel rim 141, therefore acting in response to relative motions therebetween.

Figures 6A, 6B:
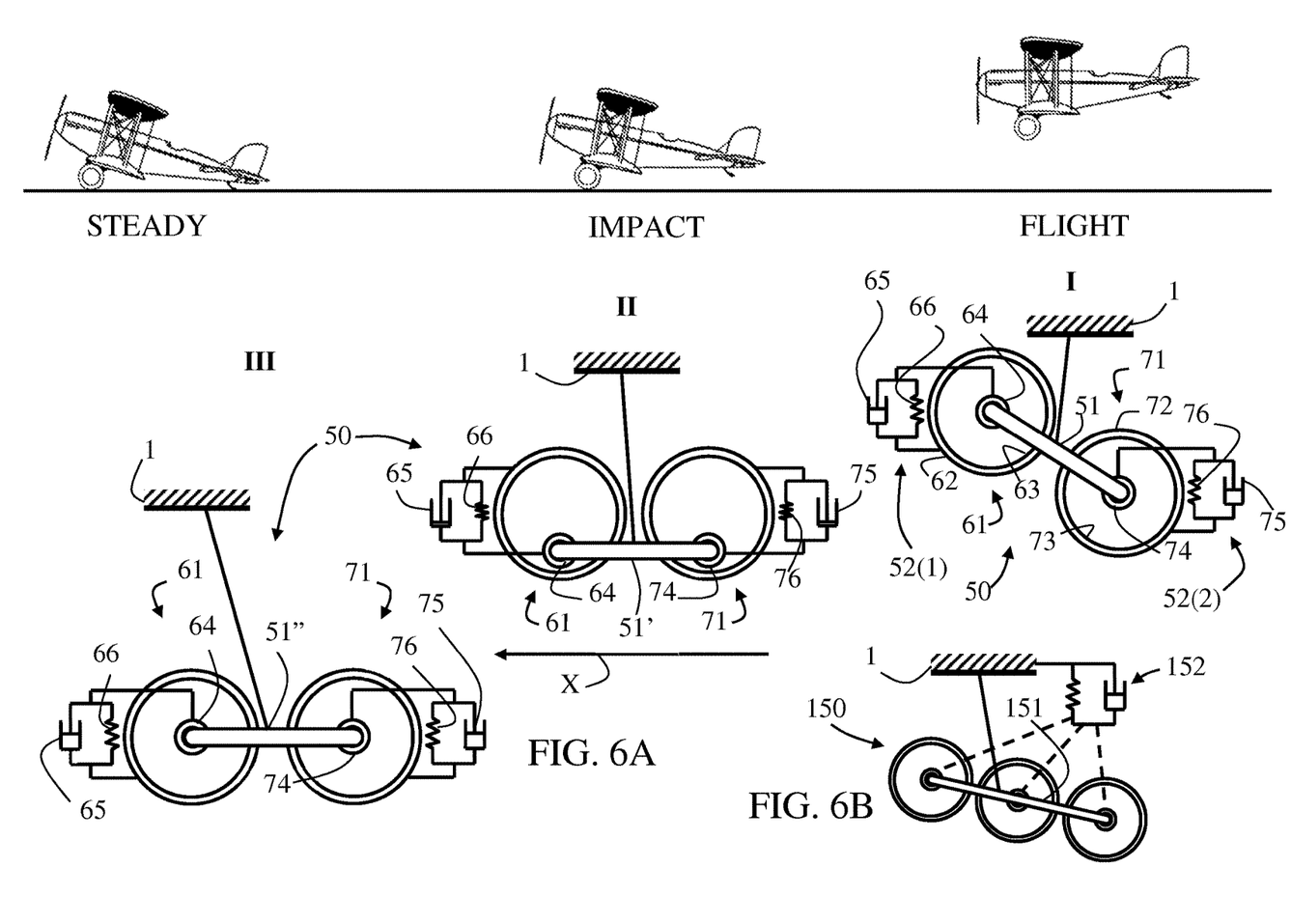
FIG. 6A schematically illustrates exemplary embodiments of another exemplary landing gear assembly including a wheel cluster, in different landing scenarios I, II and III, in accordance with some embodiments of the invention.
FIG. 6B schematically illustrates an exemplary embodiment of a 3-wheel landing gear assembly, as a variation to landing gear assembly of FIG. 6A, differentiated particularly by including a single wheel rim suspension assembly (152) connecting a rigid member (151) to landing vehicle portion (1) instead of connecting each wheel hub directly to corresponding wheel rims.

FIG. 6A schematically illustrates exemplary embodiments of a landing gear assembly 50 which includes a cluster of wheels having a first wheel 61 and a second wheel 71 adjacent to first wheel 61. First wheel 61 includes a first wheel rim 62 having a first wheel rim inner boundary 63, and a first wheel hub 64 movable in the space surrounded by first wheel rim inner boundary 63. Second wheel 71 includes a second wheel rim 72 having a second wheel rim inner boundary 73 and a second wheel hub 74 movable in the space surrounded by second wheel rim inner boundary 73. First wheel hub 64 and second wheel hub 74 are optionally fixedly connected one with the other with a rigid member 51. Rigid member 51 is optionally connected or connectable to a portion 1 of a landing vehicle. Optionally, rigid member 51 connects hubs of at least one more wheel (as shown in FIG. 6B).

In some embodiments, first wheel 61 and the second wheel 71 are sequentially arranged relative to longitudinal axis X of the landing vehicle, such that first wheel 61 is in front of second wheel 71 relative to the direction of the landing vehicle. Optionally and as shown, first wheel 61 is maintained raised with respect to second wheel 71 such that it is closer to the landing vehicle, until the landing impact. Optionally, second wheel 71 is heavier than first wheel 61 and/or second wheel 71 is farther than first wheel 61 relative to a possible hinge connection of landing gear assembly 50 with the landing vehicle.

Landing gear assembly 50 has a first wheel hub suspension assembly 52(1) which includes a first damper 65, configured to absorb a shock and/or dissipate kinetic energy during motion of first wheel hub 64 in the space surrounded by first rim inner boundary 63, and a second wheel hub suspension assembly 52(2) which includes a second damper 75, configured to absorb a shock and/or dissipate kinetic energy during motion of second wheel hub 74 in the space surrounded by second wheel rim inner boundary 73. First damper 65 includes or is coupled with a first spring 66 and is configured to damp oscillations thereof, and second damper 65 includes or is coupled with a second spring 76 and is configured to damp oscillations thereof.

In some embodiments, the wheels cluster is subjected to a shock associated with a landing impact of at least 1 meters-per-second vertical velocity, optionally at least 2 m/s, optionally at least 4 m/s, optionally at least 10 m/s, or higher, or lower, or an intermediate velocity.

As shown in the "flight" scenario (I), wheel hubs 64 and 74 are maintained at or substantially adjacent corresponding wheel rim centers, optionally using springs 66 and 76, respectively. Landing gear assembly 50 is configured such that upon the landing impact, as shown in the "impact" scenario (II), each wheel hub travels to a point below the corresponding wheel rim center such that the rigid member is in position 51' as illustrated in the "impact" scenario, before bouncing back towards the corresponding wheel rim center. In some embodiments, each of wheel hub suspension assemblies 52 acts also as a positioning apparatus for supporting a particular position of the wheel hubs, and particularly configured to continuously force the wheel hubs towards their corresponding rim centers.

As shown, at the "flight" scenario (I), both first damper 65 and second damper 75 are ready for dissipating energy during a downward travel of corresponding first wheel hub 64 and second wheel hub 74, while first spring 66 and second spring 76 are unstressed or kept preloaded and resist repositioning of the wheel hubs downward below the corresponding rim centers. At the "impact scenario" (II), following rigid member 51 travel to position 51', both first damper 66 and second damper 76 are optionally ready to a reverse travel (optionally facilitating kinetic energy dissipation as a rebound travel of the hubs) while first spring 66 and second spring 76 are stressed and acts to reposition the wheel hubs upward towards the corresponding wheel rim centers.

In some embodiments, landing gear assembly 50 is arranged and configured such that first wheel 61 contacts the ground immediately before or upon second damper 75 reaches a maximal damping capacity thereof. Optionally, alternatively or additionally, first damper 65 reacts to the landing impact only after second damper 75 reacts to the landing impact, particularly immediately before or upon second damper 75 reaches a maximal damping capacity thereof. In some embodiments, landing gear assembly 50 is arranged and configured such that first wheel hub 64 and second wheel hub 74 reach same height with respect to the ground during downward motion towards the ground.

In some embodiments, landing gear assembly 50 is arranged and configured such that first wheel hub 64 is concentric with first wheel rim 62 and second hub 74 is concentric with second wheel rim 72 upon recovery of each corresponding wheel hub suspension assembly, as illustrated in the "steady" scenario (III). In some embodiments, at the "steady" position, landing gear assembly 50 is configured such that each wheel hub suspension assembly can absorbs shocks, such as during land travel of the landing vehicle, when the wheels rotate about their respective rim centers. In some embodiments, the combination of wheel hub suspension assemblies 52(1) and 52(2) offers substantially homogenous (e.g., rotationally symmetric) shock absorption 360°, in each wheel, around the corresponding rim centers, notwithstanding shock origin at any of the wheel rims peripheries, or shock direction. In some embodiments, the combination of wheel hub suspension assemblies 52(1) and 52(2), at least when at the "steady" position, is selective and reacts to shocks only above a predetermined threshold, optionally by being rotationally symmetrically preloaded.

FIG. 6B schematically illustrates an exemplary embodiment of a 3-wheel landing gear assembly 150, which is a variation to landing gear assembly 50, differentiated particularly by including a single wheel rim suspension assembly 152 connecting a wheel hub 155 to landing vehicle portion 1 rather than directly to a wheel rim 151, therefore acting in response to relative motions therebetween.

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise. For example, the phrases: 'a unit', 'a device', 'an assembly', 'a mechanism', 'a component', 'an element', and 'a step or procedure', as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase 'consisting essentially of'.

Each of the phrases 'consisting of' and 'consists of', as used herein, means 'including and limited to'.

The phrase 'consisting essentially of', as used herein, means that the stated entity or item (system, system unit, system sub-unit, device, assembly, sub-assembly, mechanism, structure, component, element, or, peripheral equipment, utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional 'feature or characteristic' being a system unit, system sub-unit, device, assembly, sub-assembly, mechanism, structure, component, or element, or, peripheral equipment, utility, accessory, or material, step or procedure, sub-step or sub-procedure), but only if each such additional 'feature or characteristic' does not materially alter the basic novel and inventive characteristics or special technical features, of the claimed entity or item.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C.', and is considered equivalent to, and meaning the same as, the phrase 'room temperature refers to a temperature in a range of from about 20° C. to about 25° C.'.

The term 'about', as used herein, refers to ±10% of the stated numerical value.

The phrase 'operatively connected', as used herein, equivalently refers to the corresponding synonymous phrases 'operatively joined', and 'operatively attached', where the operative connection, operative joint, or operative attachment, is according to a physical, or/and electrical, or/and electronic, or/and mechanical, or/and electro-mechanical, manner or nature, involving various types and kinds of hardware or/and software equipment and components.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A landing gear assembly for a landing vehicle being an aircraft or a spacecraft, the landing gear assembly comprising:
    a wheel of the landing vehicle, comprising a wheel rim connected to a wheel hub, said wheel rim encompasses a wheel rim inner boundary and has a wheel rim center and a wheel rim inner radius spanning between said wheel rim center and said wheel rim inner boundary, said wheel hub is configured for being movable through and circularly around said wheel rim center and positionable in space surrounded by said wheel rim inner boundary, to a nominal position located within said space;
    a wheel hub positioning mechanism, including an actuator, and connected to said wheel hub, and configured to selectively confine and position said wheel hub within said space to a pre-determined position different from said nominal position; and
    a wheel hub suspension assembly, connected to said wheel hub, and operable in response to said wheel hub moving relative to said pre-determined position, said wheel hub suspension assembly comprises a damper configured to absorb a shock or/and dissipate kinetic energy during said wheel hub motion;
    wherein when said landing vehicle wheel is subjected to a shock associated with a landing impact of at least 2 meters-per-second vertical velocity, said wheel hub moves from or across said pre-determined position towards said wheel rim inner boundary, along a wheel hub maximal shifting path whose length is greater than said wheel rim inner radius.

2. The landing gear assembly of claim 1, wherein said wheel hub positioning mechanism is configured to continuously confine and position said wheel hub within said space to said pre-determined position.

3. The landing gear assembly of claim 1, wherein said wheel hub positioning mechanism is configured to lock said wheel hub at said predetermined position.

4. The landing gear assembly of claim 3, wherein said wheel hub positioning mechanism includes a directional locking member configured to allow said wheel hub passing therethrough in a first direction, and to prevent said wheel hub from passing therethrough in a second direction opposite to said first direction.

5. The landing gear assembly of claim 1, wherein said pre-determined position is, or is adjacent to, center point located within said space of said wheel rim.

6. The landing gear assembly of claim 1, wherein said nominal position is, or is adjacent to, center point located within said space of said wheel rim.

7. The landing gear assembly of claim 1, wherein said wheel hub suspension assembly includes at least one component connected between said wheel rim and said wheel hub.

8. The landing gear assembly of claim 1, wherein said wheel hub suspension assembly includes at least one component connected to inside of said wheel hub.

9. The landing gear assembly of claim 1, housed within the landing vehicle, wherein said wheel hub suspension assembly includes at least one component connected to the landing vehicle.

10. The landing gear assembly of claim 1, wherein said wheel hub suspension assembly includes at least one in-wheel damper configured and operative inside of said space of said wheel rim, and at least one out-wheel damper configured and operative outside of said space of said wheel rim.

11. The landing gear assembly of claim 10, wherein said wheel hub suspension assembly is configured such that both said in-wheel damper and said out-wheel damper actuate upon said wheel hub moving away from said pre-determined position.

12. The landing gear assembly of claim 10, wherein said wheel hub suspension assembly is configured such that said out-wheel damper actuates in response to actuation of said in-wheel damper.

13. The landing gear assembly of claim 1, wherein said damper includes, or is coupled with, a spring or spring-like member, whereby, upon said wheel hub moving away from said pre-determined position, said spring or spring-like member exhibits damping oscillations.

14. The landing gear assembly of claim 1, wherein said maximal wheel hub shifting path is part of a complete wheel hub travel circuit starting from said pre-determined position located inside first half of said space relative to center plane of said space, continuing to an interim position located inside opposite second half of said space, and ending at said nominal position.

15. The landing gear assembly of claim 1, wherein said maximal wheel hub shifting path is part of a complete wheel hub travel circuit starting from said nominal position located inside first half of said space relative to center plane of said space, continuing to an interim position located inside opposite second half of said space, and ending at said pre-determined position.

16. The landing gear assembly of claim 1, wherein said wheel hub maximal shifting length is at least 100 mm.

17. The landing gear assembly of claim 1, being connectable to, or part of, the landing vehicle.

18. The landing gear assembly of claim 17, wherein the landing vehicle is selected from the group consisting of an airplane, a drone, a glider, a helicopter, and a powered parachute.

19. The landing gear assembly of claim 1, wherein said wheel hub positioning mechanism is configured such that immediately before, or when, said landing vehicle wheel is subjected to said shock, said wheel hub positioning mechanism releases said wheel hub from said pre-determined position, whereby said wheel hub is allowed to travel to a different position within said rim.

20. The landing gear assembly of claim 19, wherein said wheel hub is allowed to move along said wheel hub maximal shifting path, through and circularly around said wheel rim center, and towards said wheel rim inner boundary.

* * * * *

UNITED STATES PATENT AND TRADEMARK OFFICE
CERTIFICATE OF CORRECTION

| | | |
|---|---|---|
| PATENT NO. | : 9,868,520 B1 | |
| APPLICATION NO. | : 14/643691 | |
| DATED | : March 10, 2015 | |
| INVENTOR(S) | : Winshtein et al. | |

It is certified that error appears in the above-identified patent and that said Letters Patent is hereby corrected as shown below:

On the Title Page

(72) Inventor should read:
Ronny Winshtein Ramat-Hasharon, IL
Daniel Barel Tel Aviv, IL
Ahishay Sardes Tel Aviv, IL Signed and Sealed this
Tenth Day of July, 2018

Andrei Iancu
*Director of the United States Patent and Trademark Office*